Dec. 25, 1951    S. J. WOODS    2,579,993
SERVING MACHINE
Filed March 8, 1946    2 SHEETS—SHEET 1

*INVENTOR.*
SAMUEL J. WOODS
BY *Victor J. Evans & Co.*
ATTORNEYS

Patented Dec. 25, 1951

2,579,993

UNITED STATES PATENT OFFICE 2,579,993

SERVING MACHINE

Samuel J. Woods, Newport, R. I.

Application March 8, 1946, Serial No. 652,938

4 Claims. (Cl. 242—7)

This invention relates to an improved serving machine and the principal object of the invention is to produce a device of this character, which is especially adapted for winding or serving wire or coil around a splice in wire or rope or similar articles to bind the splice tightly together and cover the ends of the strands.

With the above and other objects in view the invention consists of the novel details of construction, arrangement and combination of parts more fully hereinafter described, claimed and illustrated in the accompanying drawings in which:

Figure 3 is an end view of the bearing nut and cam plate therefore for the lead screws.

Figure 1:
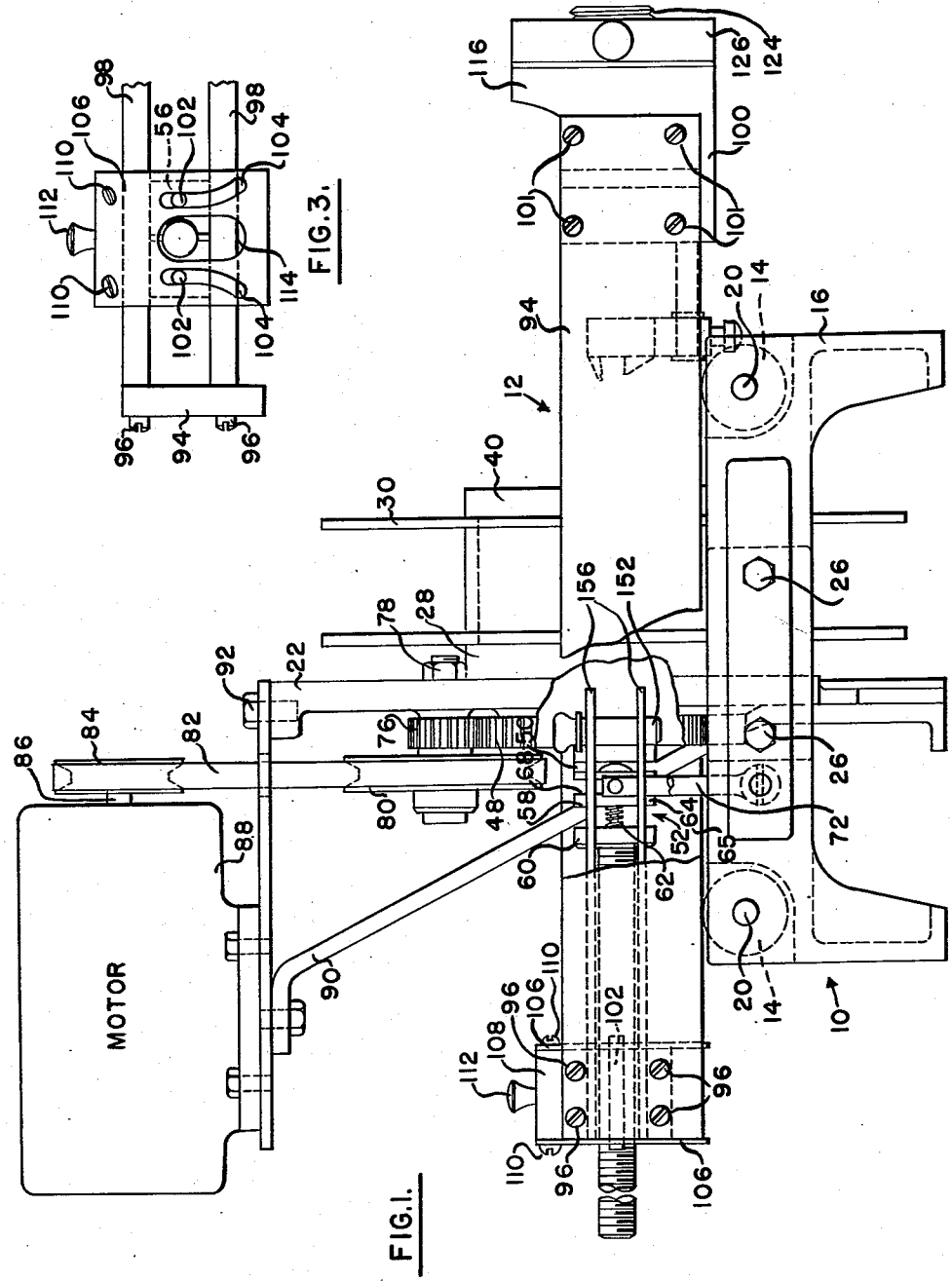
Figure 1 is a side elevation of an embodiment of the invention.
Figure 2:
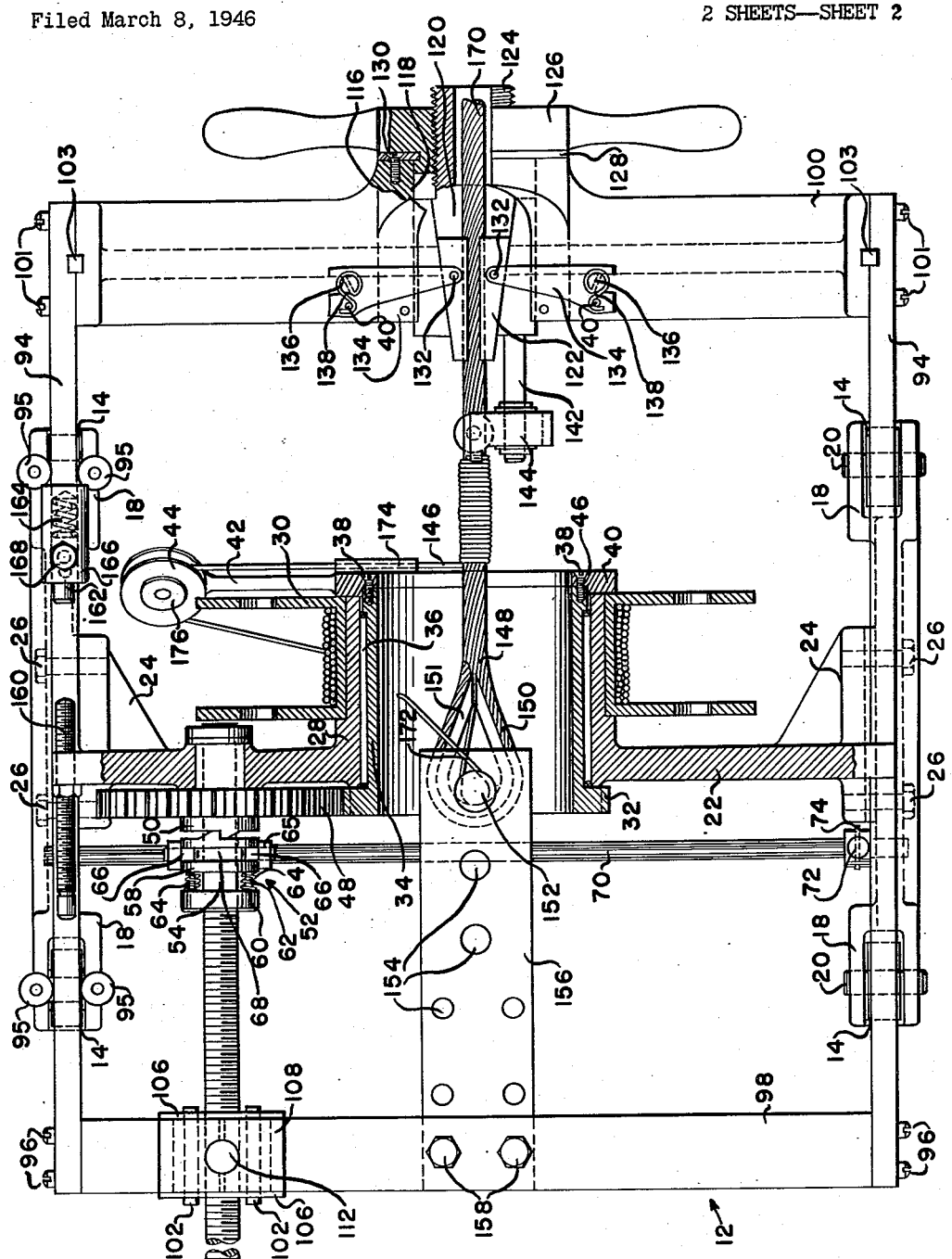
Figure 2 is a plan view thereof partly in elevation and partly in section.

Referring more in detail to the drawings the reference numeral 10 designates the base on which the carriage 12 is mounted and rollers 14 mounted on the base 10 permit movement of the carriage 12 with relation to the base 10.

The base 10 comprises side members 16 having forked portions 18 for supporting the axles 20 on which the rollers 14 are mounted and a cross member 22 is secured at its flanged ends 24 to the members 16 by bolts 26. The cross member 22 is provided with a hub or bearing support 28 for the reel 30, which is used to carry the supply of wire or cord to be served.

Gear 32 is provided with a hub 34, which is mounted for rotation within the hub 28 and roller bearings 36 permit friction free rotation thereof. Secured to the free end of the hub 34 by screws 38 is the ring 40 carrying the arm 42 on the outer end of which is mounted the pulley 44.

The ring and hub form a dovetail joint at 46 and the ring contacting the outer edge of the hub 28 retains the gear 32 and its hub 34 in position.

Gear 32 meshes with gear 48 on which the fixed member 50 of the clutch 52 is mounted and the gear 48 is rotatably mounted on the feed screw 54 journalled at one end in the member 22 and at the other end is threaded to engage the split nut 56.

The movable member 58 of the clutch 52 is loosely mounted on the screw 54 and a collar 60 formed on the screw 54 is connected to the member 58 by pins 62 loosely mounted in the member 58 and springs 64 on the pins 62 force the clutch members into engagement with each other.

Disengagement of the clutch 52 is accomplished by means of forked member 65 having pins 66 engaging in the circular slot 68 in the member 58, and the member 65 is mounted at its opposite end on the rod 70 which extends transversely of and is journalled in the side members 16. A lever 72 is secured to the rod 70 adjacent one of the members 16 by a pin 74.

Rotation of gear 48 and subsequent rotation of gear 32 and clutch 52 is obtained through engagement of the gear 76 with the gear 48. The gear 76 rotatably mounted on the bolt shaft 78 is rotated by a pulley 80 formed thereon having a belt drive connection 82 with a pulley 84 on the drive shaft 86 of the motor 88 mounted on the support 90 secured to the cross member 22 by bolts 92.

The carriage 12 comprises the side bars 94 engageable with the rollers 14 and one set of forked members 18 are provided with opposed rollers 95 which engage the side bar 94 to retain the carriage in position. The bars 94 are connected on one end by bolts 96 with the parallel spaced bars 98 and at the other end by the cross member 100 by bolts 101 and keys 103.

The bars 98 mount the split nut 56 and the nut sections are provided with pins 102 adapted to engage in the curved slots 104 in the parallel opposed cam plates 106 positioned on opposite sides of the nut 56. The plates being joined and spaced from each other by the top plate 108 secured to the plates 106 by screws 110 and the plates 106 are actuated by the knob 112 secured to the center of the plate 108. The plates 106 are provided with elliptical slots 114 to accommodate the screw 54.

The member 100 is provided with a boss 116 having an internal bore 118 in which is mounted the clamp 120 having split conical members 122 and a tubular threaded portion 124 adapted to be engaged by the hand wheel 126 which bears against a frictionless washer 128 secured to the boss 116 by screws 130.

The members 122 are pivotally connected at 132 to links 134 which are pivoted at 136 on the boss 116 and the links are tensioned by springs 138 having one end engaging the pivots 136 and the other end engaging the studs 140 on the link 134.

A bar 142 connected to the boss 116 has a clamp 144 on the free end thereof which is adapted to hold the end of the serving wire 146 until the splice 148 has been wound.

The loop 150 formed by the splice and the eye 151 positioned therein is engaged by a pin 152 positioned in openings 154 in the parallel opposed plates 156 which are secured at their free ends by bolts 158 to the bars 98 and the openings 154 are spaced in the plates 156 for various adjustments of the bolt 158.

A gauge screw 160 is mounted on one of the side bars 94 and coacting with the stop 162 tensioned by spring 164 both mounted in housing 166 secured to the bar 94 forwardly of the screw 160 by bolts 168, limits the movement of the carriage 12 to bring it to correct starting position.

To operate the machine the eye 151 is fastened to the bars 156 by the pin 152, the eye being positioned between the bars 156. The rope 170 having the splice 148 thereon is clamped by the conical member 122 of the clamp 120, a short distance from where the serving is to start and the wheel 126 is rotated to draw the rope tight.

Enough of the serving wire 146 to reach the pin 152 is drawn from the reel 30 and is fastened to the pin 152 as shown at 172, the wire is laid against the splice 148 and the serving is then started at the correct position by turning the machine by hand for one or more turns and the motor is then started. Gear 32 rotated as previously described will rotate the arm 42 fixed on the ring 40 and the wire 146 will pass from the reel 30 over pulley 44 through the guide 174 mounted on the ring 40. The reel being freely mounted on the hub 28 will serve the wire therefrom to be wound around the splice 148. The lead screw 54 is to move the carriage 12 forward as the serving is advanced on the splice for a distance equal to the diameter of the serving wire for each revolution of the guide 174 around the rope. Due to variations in the diameter of the serving wire the movement of the carriage is made equal to the maximum diameter the wire may be and the coils of wire are made to wind tightly together by disengaging the clutch 52 to stop the movement of the lead screw 54 momentarily as required.

The required tension on the serving wire is obtained by winding it one or more times around the pulley 44 so as to force the pulley to revolve as wire is being wound around the splice. Pulley 44 operates between friction discs 176 made of leather or fibre which can be adjusted to give the required braking force.

When serving is completed the split nut 56 is disengaged from the lead screw by lifting the knob 112 spreading the nut sections by means of the cam plates 106 and the carriage is returned to starting position by pushing it back until the screw 160 contacts the stop 162.

It is believed that the operation and construction of the machine will be apparent to those skilled in the art and it is to be understood that changes in the details of construction, arrangement and combination of parts may be resorted to provided they fall within the spirit of the invention and the scope of the appended claims.

Having thus described the invention what is claimed as new and desired to be secured by Letters Patent is:

1. A device of the character described, comprising a base, a carriage movable on said base, a hub formed on said base centrally thereof, a reel rotatably mounted on the hub on said base for carrying material to be served, a bar secured to said carriage and extending into said hub, a clamp secured to said carriage in opposed relation to said bar, said bar and said clamp adapted for holding a rope to be served longitudinally of said carriage, and a second hub rotatably mounted in said first hub, a gear formed on the rear edge of said second hub, a screw carried by said base and said carriage, a second gear on said screw adapted for operational engagement with said first gear, a motor driven gear engageable with said second gear whereby said gears are adapted to rotate said second hub, a pulley carried by said second hub, a guide below said pulley on said second hub whereby the material to be served when trained through said guide and over said pulley will secure said material to said rope.

2. The invention as in claim 1 wherein said screw is provided for advancing said carriage and clutch means is interposed between said screw and the gears for rotating said reel.

3. The invention as in claim 1 wherein means is provided on said carriage for clamping the end of the serving material on said rope.

4. The invention as in claim 1 wherein means is provided for limiting the movement of said carriage.

SAMUEL J. WOODS.

REFERENCES CITED

The following references are of record in the file of this patent:

UNITED STATES PATENTS

| Number | Name | Date |
|---|---|---|
| 428,873 | Adams | May 27, 1890 |
| 1,278,043 | Simpson | Sept. 3, 1918 |
| 1,363,422 | Lambert | Dec. 28, 1920 |
| 1,807,869 | Okey | June 2, 1931 |
| 1,814,464 | Baltzley | July 14, 1931 |
| 1,951,222 | Torrence | Mar. 13, 1934 |
| 2,145,439 | Torrence | Jan. 31, 1939 |
| 2,353,727 | Howard | July 18, 1944 |
| 2,375,862 | Martin et al. | May 15, 1945 |